(12) United States Patent
Edwards et al.

(10) Patent No.: US 8,059,925 B1
(45) Date of Patent: Nov. 15, 2011

(54) OPTICAL INPUT SYSTEM AND METHOD

(75) Inventors: Andrew G. Edwards, Morganville, NJ (US); Charles J. Burns, Cinnaminson, NJ (US); George S. Hartigan, Jr., Jackson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 104 days.

(21) Appl. No.: 12/186,605

(22) Filed: Aug. 6, 2008

(51) Int. Cl.
*G02B 6/00* (2006.01)

(52) U.S. Cl. .......................... 385/13; 385/12

(58) Field of Classification Search .......... 385/13, 385/12
See application file for complete search history.

(56) References Cited

U.S. PATENT DOCUMENTS

| | | | | |
|---|---|---|---|---|
| 3,526,775 A * | 9/1970 | Friedrich Kurt et al. | ..... | 250/221 |
| 4,484,179 A * | 11/1984 | Kasday | ..... | 345/176 |
| 4,542,375 A * | 9/1985 | Alles et al. | ..... | 345/176 |
| 4,701,017 A * | 10/1987 | Kookootsedes et al. | ..... | 385/141 |
| 5,605,406 A * | 2/1997 | Bowen | ..... | 400/472 |
| 6,525,677 B1 * | 2/2003 | Printzis | ..... | 341/31 |
| 6,876,786 B2 * | 4/2005 | Chliaguine et al. | ..... | 385/13 |
| 7,268,705 B2 * | 9/2007 | Kong | ..... | 341/31 |
| 7,310,090 B2 * | 12/2007 | Ho et al. | ..... | 345/175 |
| 7,351,949 B2 * | 4/2008 | Oon et al. | ..... | 250/221 |
| 7,573,463 B2 * | 8/2009 | Liess | ..... | 345/170 |
| 7,655,901 B2 * | 2/2010 | Idzik et al. | ..... | 250/227.22 |
| 2005/0156875 A1 * | 7/2005 | Kong | ..... | 345/156 |
| 2006/0066576 A1 * | 3/2006 | Kong | ..... | 345/168 |
| 2008/0284925 A1 * | 11/2008 | Han | ..... | 349/12 |

* cited by examiner

*Primary Examiner* — Rhonda Peace
(74) *Attorney, Agent, or Firm* — Howard IP Law Group, PC

(57) ABSTRACT

An optical system and method are disclosed. In an exemplary embodiment, the optical input system comprises a fiber optic cable defining an axial beam path, the fiber optic cable configured to reversibly deform at a bend location; an optical source coupled to the fiber optic cable and configured to inject an optic signal along the axial beam path; a detector coupled to the fiber optic cable and configured to receive a reflected signal from the fiber optic cable, the detector further configured to generate a distance parameter corresponding to the origin of the reflected signal; and a signal decoder configured to select a first input code from a plurality of input codes, the first input code corresponding to the distance parameter.

21 Claims, 4 Drawing Sheets

OPTICAL INPUT SYSTEM AND METHOD

FIELD OF INVENTION

The invention relates to data transfer. More specifically, the invention relates to a method and system for transferring data from one or more computer peripherals to one or more computers using fiber optic cable.

BACKGROUND

Computer peripherals or input devices, such as a mouse, keypad, or keyboard, transfer data to a central processing unit (CPU) of a computer over short runs of electrical or conductive cabling measuring only a few meters in length. There are certain circumstances in which computer peripherals need to be located at more than a few meters from the CPU. Conventional solutions to extend the distances between the CPU and peripherals typically utilize longer lengths of conductive cabling or use wireless connectivity, such as a Personal Area Network (PAN), to extend the distances between the CPU and the peripherals.

For example, various keyboard/video/mouse (KVM) extender systems enable peripherals to be located up to a couple hundred meters from the CPU. However, increasing the distance between the CPU and peripherals beyond a couple hundred meters is not possible with conventional KVM systems due to data transmission limitations and signaling speed. Additionally, conventional KVM extender systems are susceptible to being tapped or spliced between the CPU and the attached peripherals without the knowledge of the primary user or the system.

Peripherals configured to utilize Bluetooth® technology in accordance with the IEEE 802.11 specification are also able to be located at distances greater than a few meters from the CPU, but the distance is only extendable up to about 100 meters. Additionally, Bluetooth® technology, like KVM and other conventional extender systems, is susceptible to being tapped or other unknown security breaches.

Thus, an improved system and method for transferring data from one or more computer peripherals to one or more remotely located computers, is needed.

SUMMARY

An exemplary optical input apparatus comprises a fiber optic cable defining an axial beam path, the fiber optic cable configured to reversibly deform at a bend location; an optical source coupled to the fiber optic cable and configured to inject an optic signal along the axial beam path; a detector coupled to the fiber optic cable and configured to receive a reflected signal from the fiber optic cable, the detector further configured to generate a distance parameter corresponding to the origin of the reflected signal; and a signal decoder configured to select a first input code from a plurality of input codes, the first input code corresponding to the distance parameter.

An exemplary optical input method comprises the steps of injecting a signal along an axial beam path of a fiber optic cable at a first time; receiving a reflected signal corresponding to the incident signal at a second time, the reflected signal originating from a reversible deformation of the fiber optic cable at a bend location; decoding the reflected signal as a distance parameter corresponding to the bend location based on a difference between the first time and the second time; and selecting a first input code from a plurality of input codes, the first input code corresponding to the distance parameter.

An exemplary input system comprises a housing including an input key, the input key configured to reversibly move in relation to the housing from a first position to a second position; a length of fiber optic cable defining an axial beam path, wherein a portion of the length of the fiber optic cable is disposed in the housing; an optical source coupled to the length of fiber optic cable and configured to inject a signal along the axial beam path; a detector coupled to the fiber optic cable and configured to receive a reflected signal from the fiber optic cable, the detector further configured to generate a distance parameter corresponding to the origin of the reflected signal; and a signal decoder configured to select a first input code from a plurality of input codes, the first input code corresponding to the distance parameter.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein.

DETAILED DESCRIPTION

Figure 1:
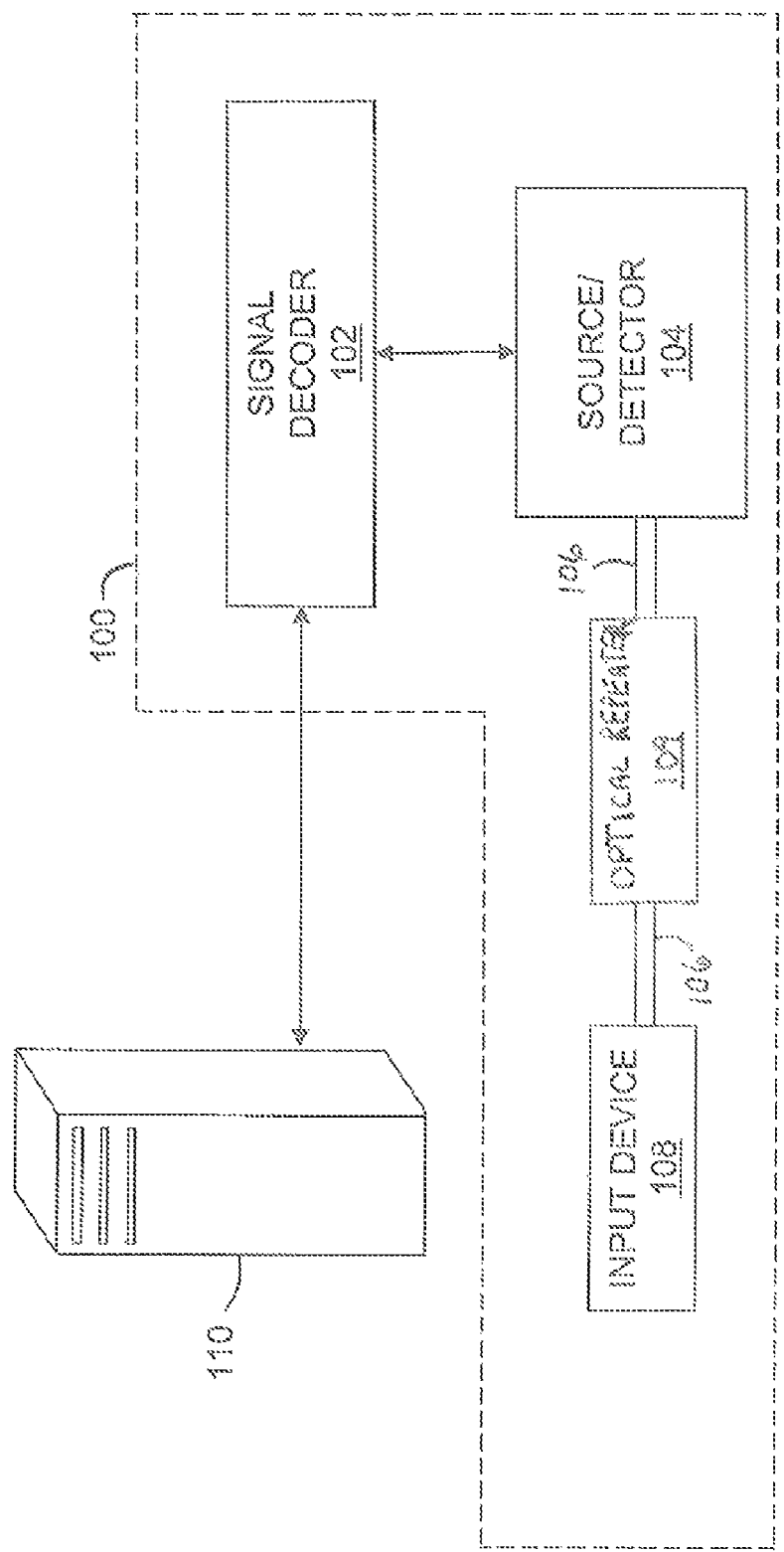
FIG. 1 is a schematic illustration of an exemplary embodiment of an optical input system.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof "horizontally," "downwardly," "upwardly," etc.) should be construed to refer to the orientation as then described or as shown in the drawing under discussion. These relative twins are for convenience of description and do not require that the apparatus be constructed or operated in a particular orientation. Terms concerning attachments, coupling, and the like, such as "connected" and "interconnected," refer to a relationship wherein structures are secured or attached to one another either directly or indirectly through intervening structures, as well as both movable or rigid attachments or relationships, unless expressly described otherwise.

To overcome the signaling speed and transmission distance limitations of electrical cabling, Applicants have invented a data transfer method and system that uses fiber optic cabling. This fiber optic cable based method and system may be used to extend the distance between computers and peripheral equipment, thereby overcoming the limitations of conventional electrical or conductive cabling. The following paragraphs describe an exemplary implementation of the method and system that may be used to transmit input data to a computer.

FIG. 1 is a schematic illustration of an exemplary embodiment of an optical input system 100 for transferring data to a computer 110. Computer 110 may be any type of computer having a central processing unit (CPU) such as a personal computer, server, or mainframe.

Additionally, computer 110 may be configured to run any type of operating system including, but not limited to, Microsoft® Windows, Linux, Mac OS X, FreeBSD®, and the like. The computer 110 may be configured with one or more of a variety of peripheral ports such as, for example, a PS/2 port, an RS232 or serial port, a USB port, an IEEE 1284 or parallel port, a Peripheral Component Interconnect (PCI) slot, and an IEEE 1394 port to which optical input system 100 may be connected.

Optical input system 100 includes a signal decoder 102 connected to a source/detector device 104. The source/detector 104 is connected to input device 108 with an optical fiber segment 106. Using fiber optic cable 106 to transfer data from input device 108 to computer 110 advantageously enables the input device 108 to be located at distances on the order of kilometers from computer 110. In some embodiments, an optical repeater may be used to extend the distance between the input device 108 and the computer 110.

Figure 3:
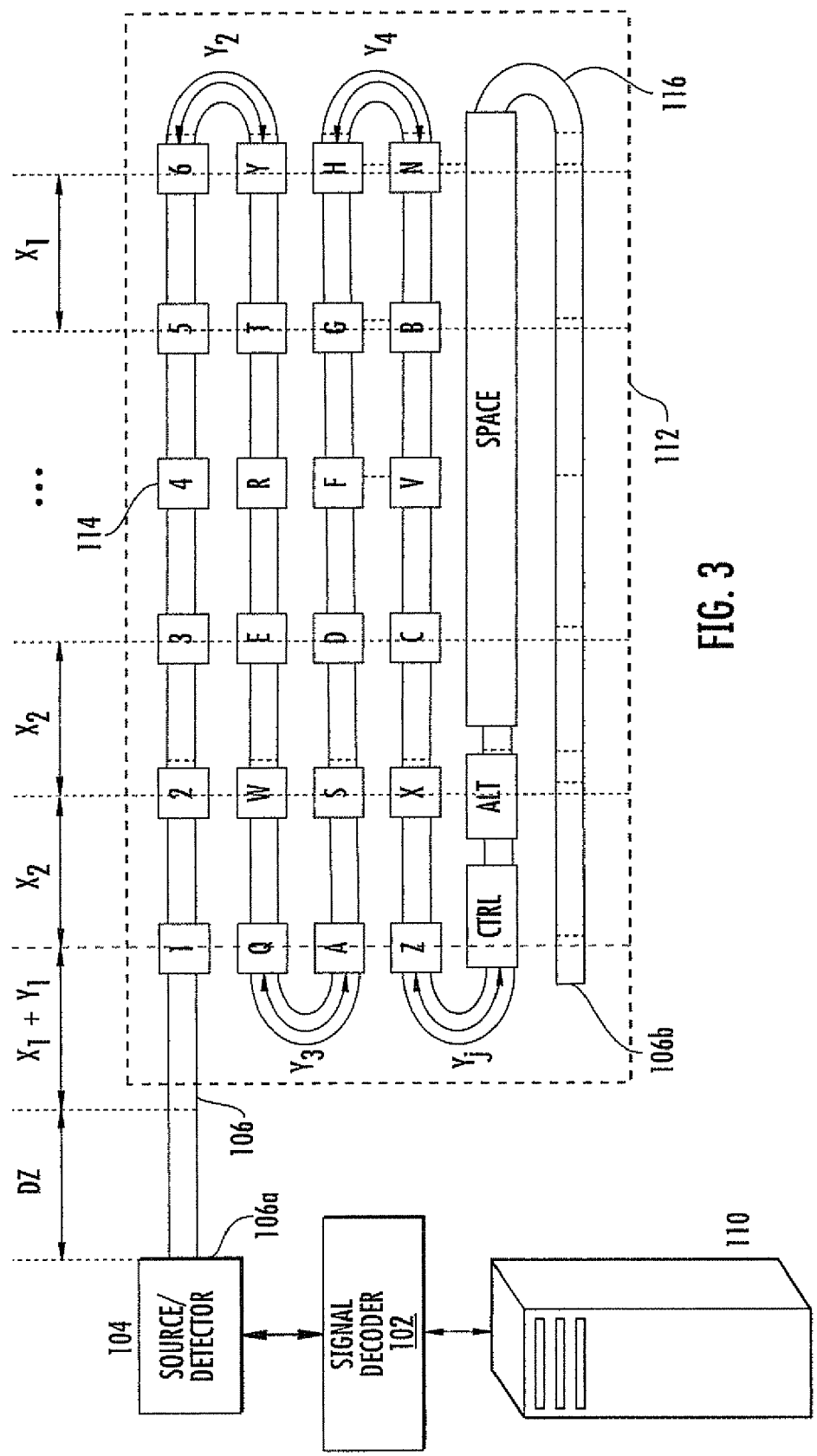
FIG. 3 is a schematic illustration of an exemplary optical input device.

Input device 108 includes a housing 112 having one or more input keys 114. The input device housing 112 may be fabricated or formed from any suitably rigid material including, but not limited to, a polymer or metal to protect the internal components of input device 108. As shown in FIG. 3, input device 108 may be a QWERTY-style keyboard having a plurality of keys arranged in a plurality of rows and columns. Note that in some embodiments input device 108 may have more or fewer input keys 114 depending on the particular needs of a system. Additionally, the one or more input keys 14 may be arranged in a variety of configurations.

Fiber optic cable 106 has a source end 106a, a terminal end 106b, and a dead zone DZ. In one embodiment, terminal end 106b is located at the end of a portion of fiber optic cable 106 that is disposed within housing 112. As shown in FIG. 3, the portion of fiber optic cable 106 within housing 112 may have a serpentine form defining a plurality of rows separated by arcs 116. Note that while fiber optic cable 106 is shown in FIG. 3 arranged in rows, optical cable 106 may also be arranged in a series of columns each separated by an arc 116. In a preferred embodiment, the one or more arcs 116 have a radius, which is greater than or equal to the minimum bend radius of the fiber optic cable 106. Fiber optic cable 106 is preferably secured within housing 112 such that axial movement (e.g., movement parallel to the beam axis defined by fiber optic cable 106) is restrained, but lateral movement (e.g., movement perpendicular to the beam axis) is permitted. For example, fiber optic cable 106 may be disposed in a track or conduit which accommodates vertical deformation of the cable 106, but substantially prevents horizontal movement.

Figure 2A:
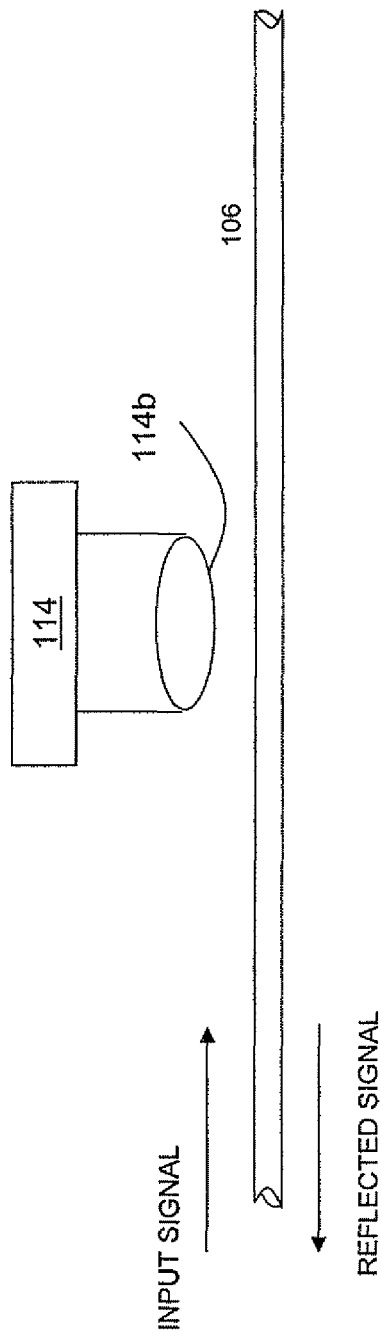
FIG. 2a is a schematic illustration of an exemplary input key in a first position.
Figure 2B:
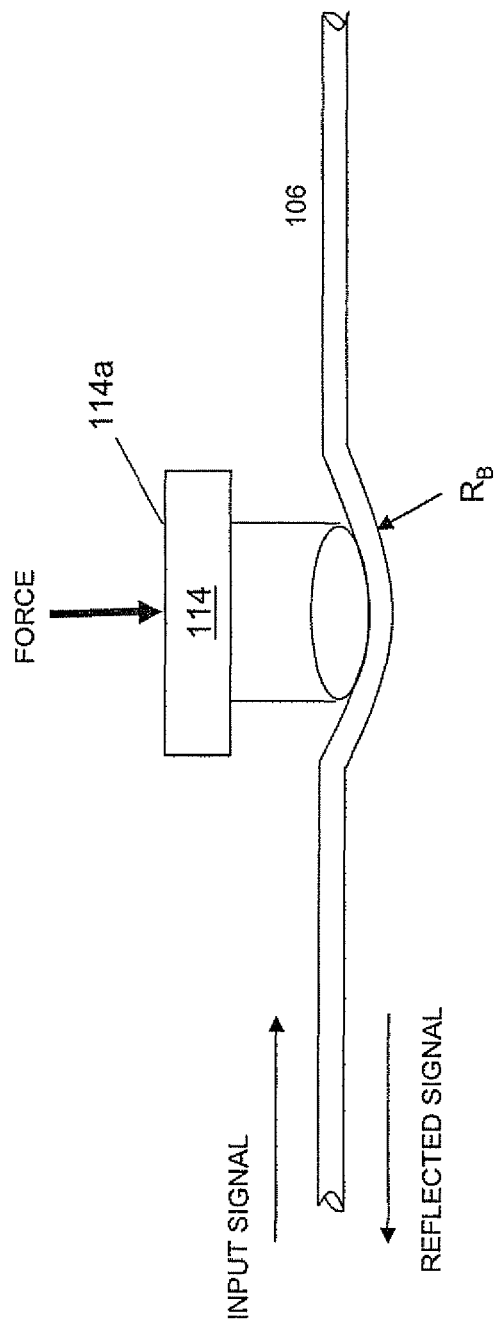
FIG. 2b is a schematic illustration of an exemplary input key in a second position.

As illustrated in FIG. 3, input keys 114 are arranged in rows and columns above fiber optic cable 106 within housing 112. In addition to corresponding to a particular letter on the keyboard (e.g., Q, W, E, R, T, Y, etc.), each input key 114 corresponds to a particular physical location along optical cable 106. As shown in FIG. 2a, each input key 114 is biased in a first position so that the bottom surface 114b of the key 114 does not alter the axial beam path of the optical fiber 106. When the upper surface 114a of an input key 114 is pressed, for example, by a user's finger, the bottom surface 114b of the input key 114 makes contact with and deforms the fiber optic cable 106 to create a bend having a bend radius, $R_B$, as shown in FIG. 2b. When the force applied to the top surface 114a of the input key 114 is removed, the input key 114 reversibly moves back to the first position shown in FIG. 2a. Additionally, fiber optic cable 106 is also returned to its initial, unbent position when the force applied to the upper surface 114a of input key 114 is removed. To facilitate the forming of the desired bend radius $R_B$ in optical cable 106, the lower surface 114b of the one or more input keys 114 may have a convex shape having a radius equal to the bend radius, $R_B$.

Source end 106a of fiber optic cable 106 is connected to source/detector device 104. Source end 106a may be connected to source/detector device using a commercially available optical fiber connector or a military grade fiber optic connector. In some embodiments, the source and detector may be separate devices. In other embodiments, the source/detector device 104 is an Optical Time Domain Reflector (OTDR) configured to inject a series of optical pulses along the beam axis of fiber optic cable 106. Source/detector device 104 is configured to receive optical signals reflected by input device 108 and to generate a reflection profile of the received signal. However, the source/detector 104 may only detect signals that are generated outside the dead zone DZ of the fiber optic cable 106. The length of the dead zone DZ is dependent on the source/detector 104 that is used. The reflection profile is used to determine the origin of the reflected signal, which is the result of an input key 114 being pressed or actuated causing a physical deformation in the fiber optic cable. Signal decoder 102 uses the information provided by source/detector circuit 104 to generate and transmit an input code to computer 110 that corresponds to an actuated input key.

In some embodiments, the source/detector device 104 and signal decoder 102 reside on a Peripheral Component Interconnect (PCI) card that is installed in a corresponding PCI slot in computer 110. Signal decoder 102 and source/detector 104 may be configured with a security protocol that signals computer 110 when an unexpected reflected signal is received by source/detector 104 or if there is a significant drop in intensity of the energy in the fiber optic cable 106. For example, if a person attempts to splice or tap into optical cable 106 between the input device 108 and computer 110, the source/detector 104 will receive a reflected signal that does not correspond to the actuation of an input key 114. Upon receipt of the unrecognized reflected signal, signal decoder 102 may transmit a signal corresponding to an alert to computer 110. Configuring the source/detector 104 and signal decoder 102 with a security protocol in combination locating the source/detector 104 and signal decoder 102 within computer 102 enhances the security of the data transmission path between the computer and remotely located peripherals as a breach in the transmission path will be detected. In environments where security is less of a concern, the source/detector device 104 and signal decoder 102 may be located externally of computer 110 and interface with computer 110 via a serial port, parallel port, IEEE 1394, PS/2, or USB connection.

In operation, the source/detector device 104 is connected to computer 110 and periodically or continuously transmits optical signals along the axial beam path of fiber optic cable 106. While transmitting the optical signals into the fiber optic cable 106, the source/detector device 104 also monitors the optical cable 106 to detect backscattered (or back-reflected) light caused by mechanical bends in the cable 106. A bend in the fiber optic cable 106 induces a bend loss in the back-reflected signal, and from this bend loss, the location of the bend may be resolved. The source/detector device 104 receives the back-reflected signals and, in connection with the signal decoder 102, a signal indicative of a key being actuated is transmitted to computer 110.

As shown in FIG. 2b, when an input key 114 of the input device 108 is pressed, the lower surface 114b of the input key 114 makes physical contact with the cladding (outer jacket) of fiber optic cable 106. The mechanical stress imparted by the lower surface 114b of the fiber optic cable 106 mechanically bends the cable 106 and induces a reflected signal having a bend loss. This bend loss is detected by source/detector device 104 as a roll-off in the power of the reflected signal. To ensure that the reflected signal's signature is detectable, the bend radius, $R_B$, should be less than one inch for infrared pulses in glass.

For each fiber type and bend radius, the back-reflected signal received by source/detector device 104 can be measured and timed to determine the location of the actuated key causing the bend. For any transmitted optical pulse, the total distance traveled, $D_T$, by the signal directly corresponds to the total round trip delay ($\Delta t$) for the reflected optical pulse. Accordingly, the following equation may be used to determine the total distance traveled ($D_T$) by a transmitted signal:

$$D_T = C \cdot \Delta t / n$$

Where C is the speed of light and 'n' is the index of refraction of the optical fiber. For example, 'n' for silica glass is on the order of 1.5. Therefore, given a known transmission time for an optical signal and the index of refraction of the fiber optic cable, the distance to the source of the optical reflection, e.g., the bend location, to the source/detector 104 can be computed by the signal processing algorithm of the source/detector device 104. Since the input keys 114 are located at known distances from the source/detector 104 along the fiber optic cable 106, the optical signal received by the source/detector device 104 will have a unique signature that corresponds to the distance for each single key that is pressed. In some embodiments, source/detector 104 may be configured to ignore reflected signals that are not the result of an actuated input key, but are instead caused by the installation/routing of the fiber optic cable 106. The distance to each key may be approximated by the following equation:

$$D = DZ + \Sigma X_a + \Sigma Y_b$$

Where,

DZ is the length of the dead zone of the fiber optic cable;

$X_a$ is the distance between adjacent columns of keys for a=1 to i; and $Y_b$ is the distance between adjacent rows of keys for b=1 to j.

The bend radius of the fiber optic cable is selected to minimize bend loss signatures due to fiber routing. In one embodiment, the bend radius may be from about one inch to approximately three inches. However, other bend radii may be used depending on the type of fiber optic cable 106. The resolution of the source/detector device 104 is selected so that the source/detector 104 can distinguish between reflected signals received from adjacent input keys. For example, if the input keys are located 0.25 inches from one another, the resolution of the source/detector 104 should be able to distinguish the 0.5 inch difference between a reflected signal from a first input key and a reflected signal from an input key adjacent to the first input key. Additionally, the induced bend loss should be greater than the loss resolution (in dB) of the source/decoder 104 to ensure that the actuation of each key 114 is detected.

The source/detector 104 resolves the location of the bend loss, and thus determines which of the input keys is actuated. A signal indicating which key was pressed is sent to the signal decoder 102. Signal decoder 102 may be configured with a variety of input codes including, but not limited to, ASCII code, UNICODE code, and UCS code point. Using the information it receives from source/detector 104, signal decoder 102 will select an appropriate code and transmits a corresponding signal to computer 110.

Figure 4:
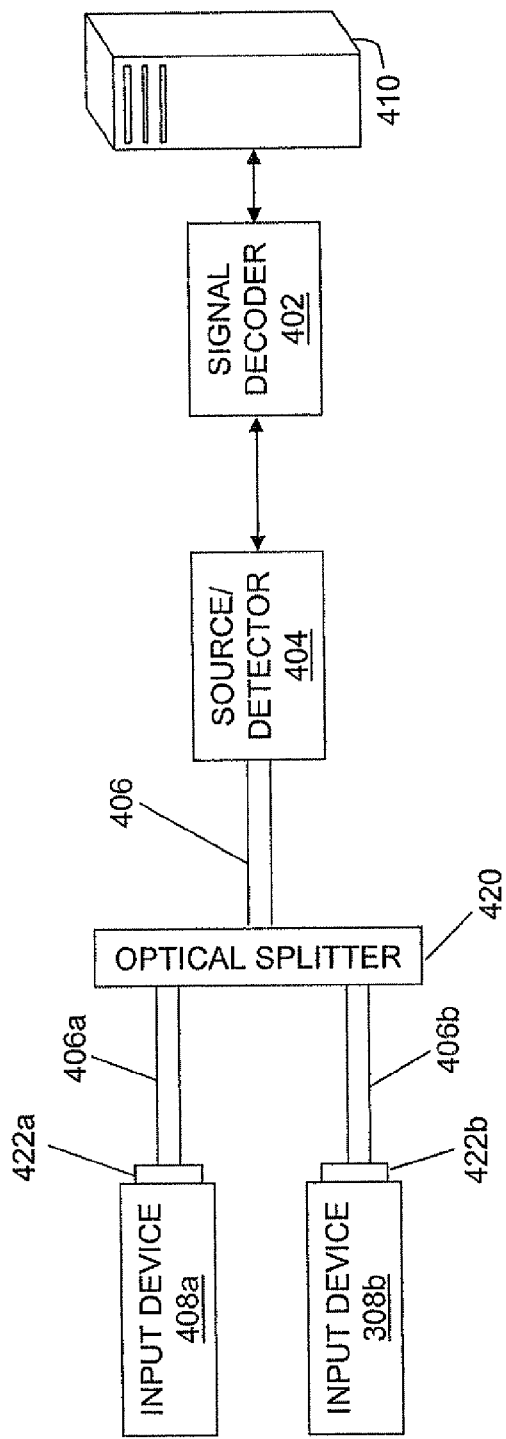
FIG. 4 is a schematic illustration of an optical input system in which multiple input devices are connected to a computer.

FIG. 4 illustrates an embodiment in which multiple input devices 408a, 408b may be connected to a single computer 410. Note that although FIG. 4 is illustrated with two input devices connected to computer 410, more input devices may be connected to computer 410. As shown in FIG. 4, fiber optic cable 406 is connected at one end to source/detector device 404 and to an optical splitter 420 at the other end. Optical splitter 420 is connected to input device 408a via fiber optic cable segment 406a and to input device 408b via fiber optic cable segment 406b. Input devices 408a and 408b are connected to their respective fiber optic cable segments 406a and 406b by optical coupling devices 422a and 422b. In this configuration, input devices 408a and 408b may be releasably coupled to their respective fiber optic segments 406a and 406b. Optical coupling devices 422a and 422b may include a filter configured to pass a portion of the full frequency or wavelength spectrum transmitted by source/detector device 404 so that signal decoder 402 can easily determine from which input device 408a, 408b a reflected signal originated.

For example, in operation the source/detector device 404 will transmits an optical signal having a range of wavelengths, e.g., 1300 nm to 1700 nm, which is transmitted to input devices 408a and 408b by way of optical splitter 420. If optical coupling device 422a connected to input includes a filter configured to pass wavelengths between 1300 nm and 1450 nm, then only wavelengths within that range will be transmitted to input device 408a. Similarly, optical coupling device 422b may include a filter configured to pass wavelengths between 1550 nm and 1700 nm and thus only wavelengths within this range will be transmitted to optical input device 408b. Accordingly, if a reflected signal having is received by source/detector circuit 404 has a wavelength between 1300 nm and 1450, then it originated at input device 408a, and if a reflected signal is received by source/detector circuit 404 has a wavelength between 1550 nm and 1700 nm, then it originated at input device 408b. Signal decoder 402 may be further configured to resolve which key of which input device has been actuated as described above.

Figure 5:
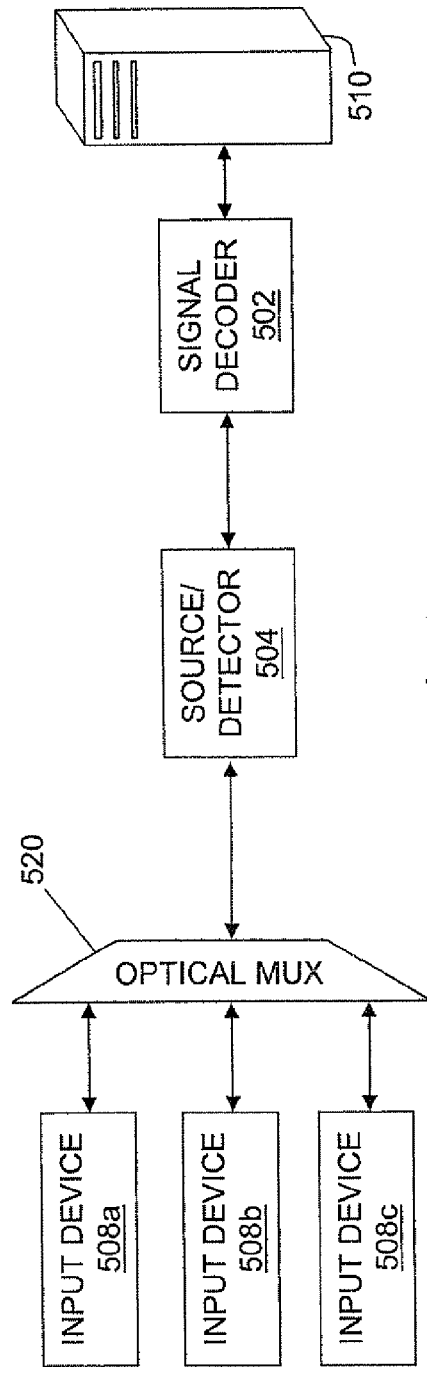
FIG. 5 is a schematic illustration of an optical input system in which multiple input devices are connected to computer.

FIG. 5 illustrates another embodiment where multiple input devices 508a, 508b, 508c are connected to a computer 510. As shown in FIG. 5, input devices 508a, 508b, 508c are connected to a source/detector 504 through an optical multiplexer (mux) 520. Source/detector 504 is connected to signal decoder 502, which is connected to computer 510. In one embodiment, optical mux 520 is a wavelength division multiplexer (WDM) configured to multiplex one or more optical signals received from input devices 508a, 508b, 508c into a signal optical signal that can be transmitted over an optical link to source/detector 504. Optical mux 520 is further configured to demultiplex an optical signal received from source/detector 504 into a number of optical signals equal to the number of input devices 508a, 508b, 508c connected to the optical mux 520. In the embodiment shown in FIG. 5, each input device 508a, 508b, 508c may be connected to optical mux 520 through a fiber optic coupling device (not shown). The fiber optic coupling device may include a diffraction grating such that each input device 508a, 508b, 508c only transmits a signal having a particular wavelength back to source/detector 504. In this manner, signal decoder 502 and/or computer 510 may be able to determine from which input device 508a, 508b, 508c a received reflected signal originated. Note that other optical filters may be used to uniquely identify received reflected signals when multiple input devices are connected to a computer.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An optical input system, comprising:
   an optical source coupled to a fiber optic cable, the optical source configured to inject an optic signal along an axial beam path of the fiber optic cable;
   a key capable of being actuated by a finger of a user, the key for reversibly deforming the fiber optic cable as a consequence of being actuated;
   a detector coupled to an end of the fiber optic cable, the detector configured to receive a reflected signal from the fiber optic cable and to generate a distance parameter corresponding to the origin of the reflected signal, the origin of the reflected signal corresponding to the location of the deformation of the fiber optic cable; and
   a signal decoder configured to select a first input code from a plurality of input codes, the first input code corresponding to the distance parameter.

2. The system of claim 1, wherein the fiber optic cable is configured to reversibly deform at a plurality of bend locations along the fiber optic cable.

3. The system of claim 2, wherein a distance between adjacent bend locations is greater than or equal to a distance resolution of the detector.

4. The system of claim 1, wherein the fiber optic cable has a serpentine form defining a plurality of rows and having at least one arc.

5. The system of claim 4, wherein the at least one arc has a radius greater than or equal to a minimum bend radius of the fiber optic cable.

6. The system of claim 1, wherein the fiber optic cable has a serpentine form defining a plurality of columns and having at least one arc.

7. The system of claim 6, wherein the at least one arc has a radius greater than or equal to a minimum bend radius of the fiber optic cable.

8. The system of claim 1, wherein the plurality of input codes includes at least one of an ASCII code, a UNICODE code point, or a UCS code point.

9. The system of claim 1 further comprising an optical repeater disposed along the fiber optic cable between the key and the optical source for extending the distance between the actuator and the optical source.

10. An optical input method, comprising:
    injecting a signal along an axial beam path in a fiber optic cable at a first time;
    pressing a key capable of being actuated by a finger of a user, to reversibly deform the fiber optic cable;
    receiving, at an end of the fiber optic cable, a reflected signal corresponding to the injected signal at a second time, the reflected signal originating from the reversible deformation of the fiber optic cable at a bend location;
    decoding the reflected signal as a distance parameter corresponding to the bend location based on a difference between the first time and the second time; and
    selecting a first input code from a plurality of input codes, the first input code corresponding to the distance parameter.

11. The optical input method of claim 10, further comprising:
    calibrating a detector configured to receive the reflected signal and a decoder configured to decode the reflected signal.

12. The optical input method of claim 10, further comprising:
    transmitting the first input code to a computer.

13. The optical input method of claim 12, wherein the first input code is one of ASCII, UNICODE code point, and UCS code point.

14. The optical input method of claim 10, further comprising:
    receiving a second input code within a chord interval after one of the first or the second time; and
    selecting a third input code from the plurality of input codes, the third input code corresponding to a relationship between the first and second input codes.

15. An input system comprising:
    a fiber optic cable configured to reversibly deform at a plurality of locations, the fiber optic cable defining an axial beam path;
    a plurality of keys disposed along the fiber optic cable, each of the plurality of keys capable of being actuated by a finger of a user and configured to reversibly move from a first position to a second, each of the plurality of keys contacting and deforming the fiber optic cable in the second position;
    a source connected to the fiber optic cable, the source configured to transmit a signal along the axial beam path;
    a detector coupled to an end of the fiber optic cable, the detector configured to receive a one or more reflected signals from the fiber optic cable and to generate a distance parameter for each of the one or more reflected signals; and
    a signal decoder configured to select a first input code from a plurality of input codes, the first input code corresponding to the distance parameter of a first reflected signal of the one or more reflected signals received by the detector.

16. The input system of claim 15, wherein the signal decoder is further configured to transmit the input code to a computer.

17. The input system of claim 16, wherein the plurality of input codes includes at least one of an ASCII code, a UNICODE code point, or a UCS code point.

18. The input system of claim 16, wherein the source and the detector are disposed on a PCI card within the computer.

19. The input system of claim 15, wherein the signal decoder is further configured with a security protocol.

20. The input system of claim 15 further comprising an optical repeater disposed along the optical cable between the plurality of keys and the source for increasing the distance between the plurality of keys and the source.

21. An input system comprising:
    a first fiber optic cable configured to reversibly deform at a plurality of locations, the first fiber optic cable defining a first axial beam path;
    a first plurality of keys disposed along the first fiber optic cable, each of the first plurality of keys capable of being actuated by a finger of a user and configured to reversibly move from a first position to a second, each of the first plurality of keys contacting and deforming the first fiber optic cable in the second position;
    a second fiber optic cable configured to reversibly deform at a plurality of locations, the second fiber optic cable defining a second axial beam path;
    a second plurality of keys disposed along the second fiber optic cable, each of the second plurality of keys capable of being actuated by a finger of a user and configured to reversibly move from a first position to a second, each of the second plurality of keys contacting and deforming the second fiber optic cable in the second position;
a third fiber optic cable;
an fiber optic mux or a splitter connected to the first, second and third fiber optic cables;
a source connected to the third fiber optic cable, the source configured to transmit a signal along the first and second axial beam paths;
a detector coupled to an end of the third fiber optic cable, the detector configured to receive a one or more reflected signals from the first and second fiber optic cables and to generate a distance parameter for each of the one or more reflected signals; and
a signal decoder configured to select a first input code from a plurality of input codes, the first input code corresponding to the distance parameter of a first reflected signal of the one or more reflected signals received by the detector.

* * * * *